United States Patent
Qiu et al.

(10) Patent No.: US 9,477,482 B2
(45) Date of Patent: Oct. 25, 2016

(54) SYSTEM, METHOD, AND COMPUTER PROGRAM PRODUCT FOR IMPLEMENTING MULTI-CYCLE REGISTER FILE BYPASS

(71) Applicant: NVIDIA Corporation, Santa Clara, CA (US)

(72) Inventors: Xiaogang Qiu, San Jose, CA (US); Ian Chi Yan Kwong, Santa Clara, CA (US); Ming Yiu Siu, Santa Clara, CA (US); Jack H. Choquette, Palo Alto, CA (US); Michael Alan Fetterman, Boxborough, MA (US)

(73) Assignee: NVIDIA Corporation, Santa Clara, CA (US)

( * ) Notice: Subject to any disclaimer, the term of this patent is extended or adjusted under 35 U.S.C. 154(b) by 510 days.

(21) Appl. No.: 14/038,672

(22) Filed: Sep. 26, 2013

(65) Prior Publication Data
US 2015/0089202 A1    Mar. 26, 2015

(51) Int. Cl.
*G06F 9/38* (2006.01)
*G06F 9/30* (2006.01)
*G06F 9/46* (2006.01)

(52) U.S. Cl.
CPC .......... *G06F 9/3887* (2013.01); *G06F 9/3012* (2013.01); *G06F 9/3826* (2013.01); *G06F 9/3828* (2013.01); *G06F 9/3851* (2013.01); *G06F 9/3869* (2013.01); *G06F 9/46* (2013.01)

(58) Field of Classification Search
CPC .. G06F 9/3887; G06F 9/3012; G06F 9/3826; G06F 9/3828; G06F 9/3851; G06F 9/3869; G06F 9/46
See application file for complete search history.

(56) References Cited

U.S. PATENT DOCUMENTS

| | | | |
|---|---|---|---|
| 5,764,946 A * | 6/1998 | Tran | G06F 9/3844 711/118 |
| 2005/0081017 A1* | 4/2005 | Rupley, II | G06F 9/30043 712/208 |
| 2009/0199020 A1* | 8/2009 | Bose | G06F 1/3203 713/300 |
| 2012/0159217 A1* | 6/2012 | Venkataramanan | G06F 1/3203 713/323 |
| 2014/0115301 A1* | 4/2014 | Sanghai | G06F 9/30072 712/220 |

* cited by examiner

*Primary Examiner* — Farley Abad
(74) *Attorney, Agent, or Firm* — Zilka-Kotab, PC (57) ABSTRACT

A system, method, and computer program product are provided for implementing a multi-cycle register file bypass mechanism. The method includes the steps of receiving a set of control bits, combining the set of control bits with a set of valid bits associated with previously issued instructions, and enabling a bypass path for each thread based on the set of control bits and the set of valid bits. Each valid bit in the set of valid bits indicates whether execution of an instruction of the previously issued instructions was enabled for a thread in a thread block.

20 Claims, 8 Drawing Sheets

SYSTEM, METHOD, AND COMPUTER PROGRAM PRODUCT FOR IMPLEMENTING MULTI-CYCLE REGISTER FILE BYPASS

FIELD OF THE INVENTION

The present invention relates to processor architectures, and more particularly to processors that enable a multi-cycle, register file bypass path.

BACKGROUND

Modern graphics processing units (GPUs) include highly parallel architectures capable of executing hundreds and even thousands of threads in parallel substantially simultaneously. In such architectures, bypass circuits have been implemented in order to enable data scheduled for storage in the register file to be routed, during the same clock cycle, to the input of a data path to be reused. However, typically, such bypass mechanisms are implemented in logic located in the register file of an integrated circuit. When groups of related threads are executed within these processors, multiple copies of the logic perform essentially the same operation, thereby creating redundant logic that increases the complexity of the integrated circuit. Thus, there is a need for addressing this issue and/or other issues associated with the prior art.

SUMMARY

A system, method, and computer program product are provided for implementing a multi-cycle register file bypass mechanism. The method includes the steps of receiving a set of control bits, combining the set of control bits with a set of valid bits associated with previously issued instructions, and enabling a bypass path for each thread based on the set of control bits and the set of valid bits. Each valid bit in the set of valid bits indicates whether execution of an instruction of the previously issued instructions was enabled for a thread in a thread block.

DETAILED DESCRIPTION

A processor includes a scheduler unit that is configured to generate control bits associated with an instruction issued to a plurality of execution pipelines. The control bits represent a set of bypass enable signals for a plurality of threads being executed by the execution pipelines. A thread block, or warp, comprises a number (e.g., 32) of threads executing in parallel. Each thread in the thread block executes the same instruction on different data during a particular clock cycle. Threads may be allowed to diverge, thereby allowing some threads to execute the instruction while other threads are idle. Because each thread is executing the same instruction, the bypass enable signals generated by the scheduler unit are the same for every thread. However, because threads are allowed to diverge, data accessible via a particular bypass path for one thread may be valid while data accessible via the particular bypass path for another thread may be invalid. Therefore, logic associated with each thread combines the control bits with thread specific valid bits to enable or disable various bypass paths of the register file. By moving the comparison logic for generating the control bits to a central location and broadcasting the control bits to a plurality of execution pipelines, which then combine the control bits with the thread specific valid bits, processor complexity can be reduced and bypass logic need not be replicated for each execution pipeline, thereby saving power and making the processor more efficient as well as reducing routing complexity.

Figure 1:
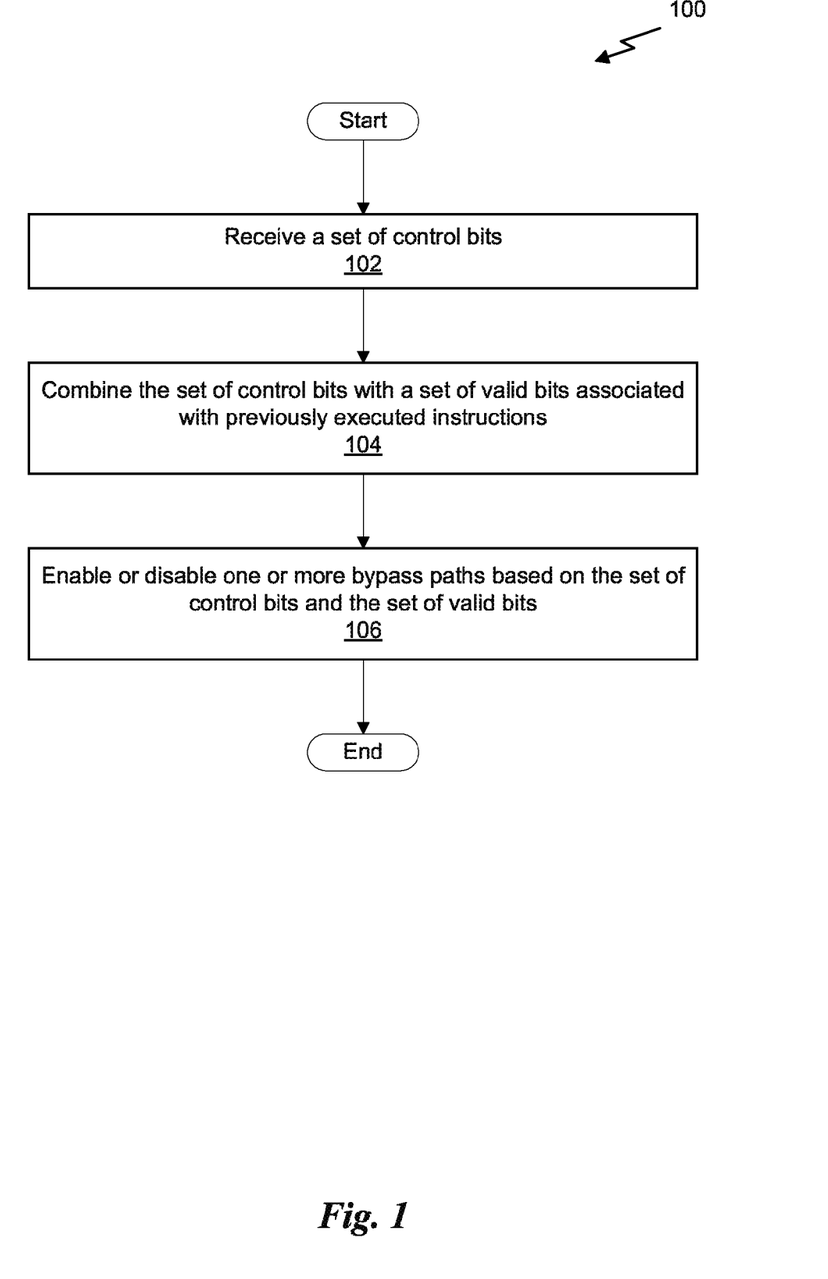
FIG. 1 illustrates a flowchart of a method for implementing a multi-cycle, register file bypass mechanism, according to one embodiment.

FIG. 1 illustrates a flowchart of a method 100 for implementing a multi-cycle, register file bypass mechanism, according to one embodiment. At step 102, a set of control bits is received by a portion of a register file. In the context of the present description, the set of control bits comprises a number of bits corresponding to a number of bypass paths implemented in each lane of the register file. In one embodiment, each lane corresponds to a plurality of registers within the register file and is associated with a particular execution pipeline. At step 104, the set of control bits is combined with a set of valid bits associated with previously executed instructions. In one embodiment, each control bit is combined, via an AND logic gate, with a corresponding valid bit associated with an instruction issued to the execution unit associated with a particular thread allocated to the lane of the register file. At step 106, a bypass path is enabled based on the set of control bits and the set of valid bits.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
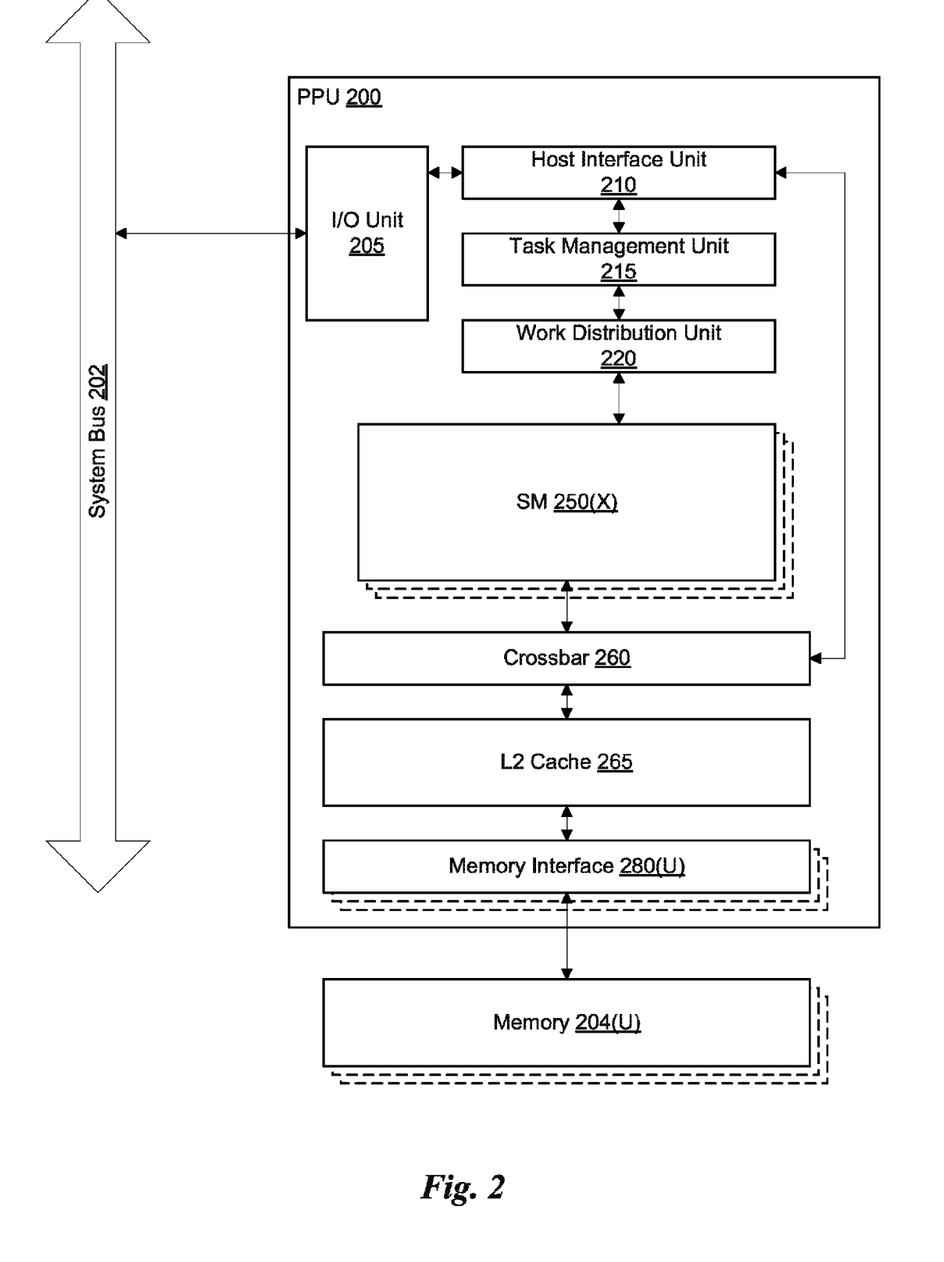
FIG. 2 illustrates a parallel processing unit (PPU), according to one embodiment.

FIG. 2 illustrates a parallel processing unit (PPU) 200, according to one embodiment. While a parallel processor is provided herein as an example of the PPU 200, it should be strongly noted that such processor is set forth for illustrative purposes only, and any processor may be employed to supplement and/or substitute for the same. In one embodiment, the PPU 200 is configured to execute a plurality of threads concurrently in two or more streaming multi-processors (SMs) 250. A thread (i.e., a thread of execution) is an instantiation of a set of instructions executing within a particular SM 250. Each SM 250, described below in more detail in conjunction with FIG. 3, may include, but is not limited to, one or more processing cores, one or more load/store units (LSUs), a level-one (L1) cache, shared memory, and the like.

In one embodiment, the PPU 200 includes an input/output (I/O) unit 205 configured to transmit and receive communications (i.e., commands, data, etc.) from a central processing unit (CPU) (not shown) over the system bus 202. The I/O unit 205 may implement a Peripheral Component Interconnect Express (PCIe) interface for communications over a PCIe bus. In alternative embodiments, the I/O unit 205 may implement other types of well-known bus interfaces.

The PPU 200 also includes a host interface unit 210 that decodes the commands and transmits the commands to the task management unit 215 or other units of the PPU 200 (e.g., memory interface 280) as the commands may specify. The host interface unit 210 is configured to route communications between and among the various logical units of the PPU 200.

In one embodiment, a program encoded as a command stream is written to a buffer by the CPU. The buffer is a region in memory, e.g., memory 204 or system memory, that is accessible (i.e., read/write) by both the CPU and the PPU 200. The CPU writes the command stream to the buffer and then transmits a pointer to the start of the command stream to the PPU 200. The host interface unit 210 provides the task management unit (TMU) 215 with pointers to one or more streams. The TMU 215 selects one or more streams and is configured to organize the selected streams as a pool of pending grids. The pool of pending grids may include new grids that have not yet been selected for execution and grids that have been partially executed and have been suspended.

A work distribution unit 220 that is coupled between the TMU 215 and the SMs 250 manages a pool of active grids, selecting and dispatching active grids for execution by the SMs 250. Pending grids are transferred to the active grid pool by the TMU 215 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 220. In addition to receiving grids from the host interface unit 210 and the work distribution unit 220, the TMU 215 also receives grids that are dynamically generated by the SMs 250 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 200. An application may include instructions (i.e., API calls) that cause the driver kernel to generate one or more grids for execution. In one embodiment, the PPU 200 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 200 comprises X SMs 250(X). For example, the PPU 200 may include 15 distinct SMs 250. Each SM 250 is multi-threaded and configured to execute a plurality of threads (e.g., 32 threads) from a particular thread block concurrently. Each of the SMs 250 is connected to a level-two (L2) cache 265 via a crossbar 260 (or other type of interconnect network). The L2 cache 265 is connected to one or more memory interfaces 280. Memory interfaces 280 implement 16, 32, 64, 128-bit data buses, or the like, for high-speed data transfer. In one embodiment, the PPU 200 comprises U memory interfaces 280(U), where each memory interface 280(U) is connected to a corresponding memory device 204(U). For example, PPU 200 may be connected to up to 6 memory devices 204, such as graphics double-data-rate, version 5, synchronous dynamic random access memory (GDDR5 SDRAM).

In one embodiment, the PPU 200 implements a multi-level memory hierarchy. The memory 204 is located off-chip in SDRAM coupled to the PPU 200. Data from the memory 204 may be fetched and stored in the L2 cache 265, which is located on-chip and is shared between the various SMs 250. In one embodiment, each of the SMs 250 also implements an L1 cache. The L1 cache is private memory that is dedicated to a particular SM 250. Each of the L1 caches is coupled to the shared L2 cache 265. Data from the L2 cache 265 may be fetched and stored in each of the L1 caches for processing in the functional units of the SMs 250.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the TMU 215 may configure one or more SMs 250 to execute a vertex shader program that processes a number of vertices defined by the model data. In one embodiment, the TMU 215 may configure different SMs 250 to execute different shader programs concurrently. For example, a first subset of SMs 250 may be configured to execute a vertex shader program while a second subset of SMs 250 may be configured to execute a pixel shader program. The first subset of SMs 250 processes vertex data to produce processed vertex data and writes the processed vertex data to the L2 cache 265 and/or the memory 204. After the processed vertex data is rasterized (i.e., transformed from three-dimensional data into two-dimensional data in screen space) to produce fragment data, the second subset of SMs 250 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 3:
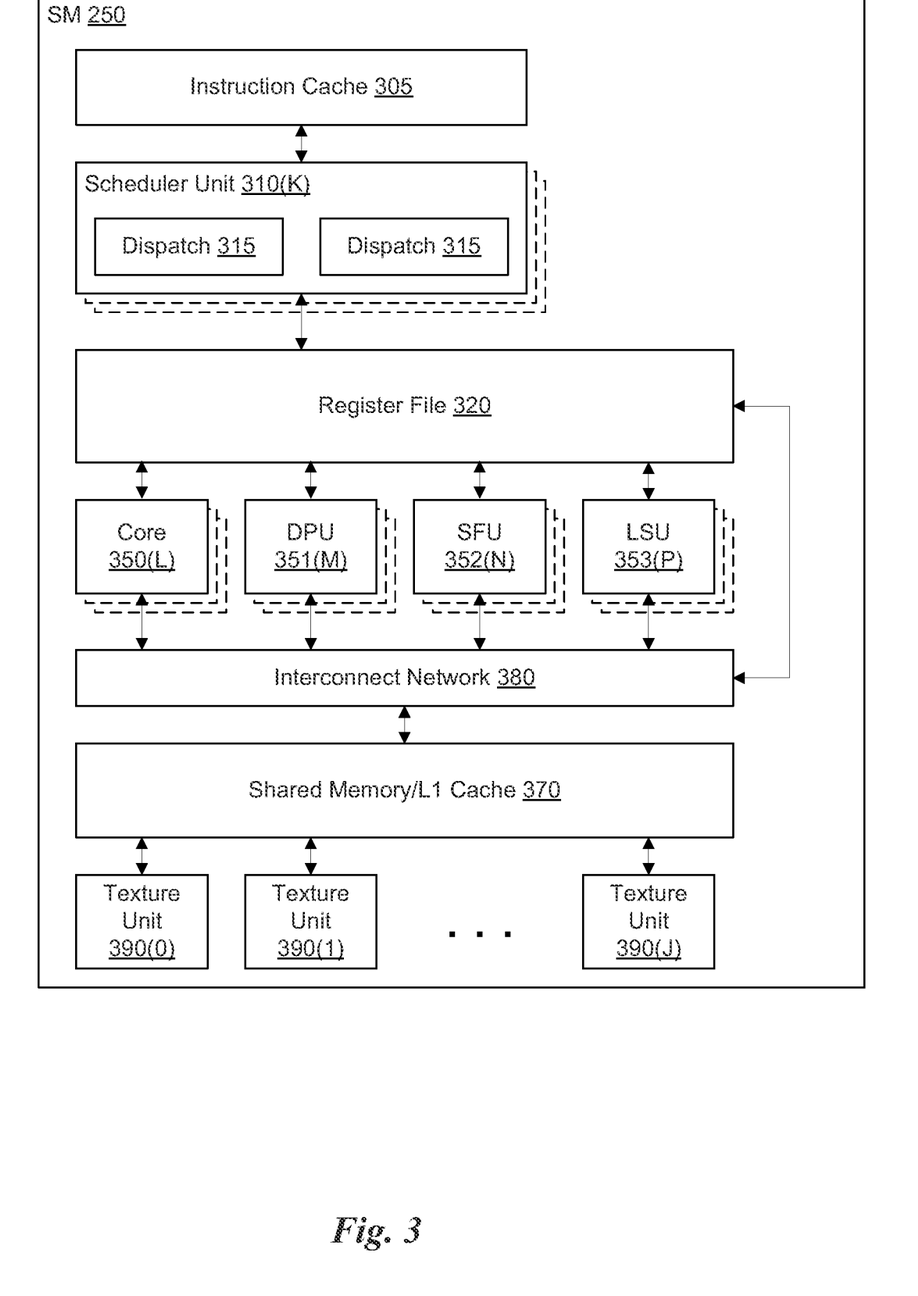
FIG. 3 illustrates the streaming multi-processor of FIG. 2, according to one embodiment.

FIG. 3 illustrates the streaming multi-processor 250 of FIG. 2, according to one embodiment. As shown in FIG. 3, the SM 250 includes an instruction cache 305, one or more scheduler units 310, a register file 320, one or more processing cores 350, one or more double precision units (DPUs) 351, one or more special function units (SFUs) 352, one or more load/store units (LSUs) 353, an interconnect network 380, a shared memory/L1 cache 370, and one or more texture units 390.

As described above, the work distribution unit 220 dispatches active grids for execution on one or more SMs 250 of the PPU 200. The scheduler unit 310 receives the grids from the work distribution unit 220 and manages instruction scheduling for one or more thread blocks of each active grid. The scheduler unit 310 schedules threads for execution in groups of parallel threads, where each group is called a warp. In one embodiment, each warp includes 32 threads. The scheduler unit 310 may manage a plurality of different thread blocks, allocating the thread blocks to warps for execution and then scheduling instructions from the plurality of different warps on the various functional units (i.e., cores 350, DPUs 351, SFUs 352, and LSUs 353) during each clock cycle.

In one embodiment, each scheduler unit 310 includes one or more instruction dispatch units 315. Each dispatch unit 315 is configured to transmit instructions to one or more of the functional units. In the embodiment shown in FIG. 3, the scheduler unit 310 includes two dispatch units 315 that enable two different instructions from the same warp to be dispatched during each clock cycle. In alternative embodiments, each scheduler unit 310 may include a single dispatch unit 315 or additional dispatch units 315.

Each SM 250 includes a register file 320 that provides a set of registers for the functional units of the SM 250. In one embodiment, the register file 320 is divided between each of the functional units such that each functional unit is allocated a dedicated portion of the register file 320. In another embodiment, the register file 320 is divided between the different warps being executed by the SM 250. The register file 320 provides temporary storage for operands connected to the data paths of the functional units.

Each SM 250 comprises L processing cores 350. In one embodiment, the SM 250 includes a large number (e.g., 192, etc.) of distinct processing cores 350. Each core 350 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 250 also comprises M DPUs 351 that implement double-precision floating point arithmetic, N SFUs 352 that perform special functions (e.g., copy rectangle, pixel blending operations, and the like), and P LSUs 353 that implement load and store operations between the shared memory/L1 cache 370 and the register file 320. In one embodiment, the SM 250 includes 64 DPUs 351, 32 SFUs 352, and 32 LSUs 353.

Each SM 250 includes an interconnect network 380 that connects each of the functional units to the register file 320 and the shared memory/L1 cache 370. In one embodiment, the interconnect network 380 is a crossbar that can be configured to connect any of the functional units to any of the registers in the register file 320 or the memory locations in shared memory/L1 cache 370.

In one embodiment, the SM 250 is implemented within a GPU. In such an embodiment, the SM 250 comprises J texture units 390. The texture units 390 are configured to load texture maps (i.e., a 2D array of texels) from the memory 204 and sample the texture maps to produce sampled texture values for use in shader programs. The texture units 390 implement texture operations such as anti-aliasing operations using mip-maps (i.e., texture maps of varying levels of detail). In one embodiment, the SM 250 includes 16 texture units 390.

The PPU 200 described above may be configured to perform highly parallel computations much faster than conventional CPUs. Parallel computing has advantages in graphics processing, data compression, biometrics, stream processing algorithms, and the like.

Figure 4A:
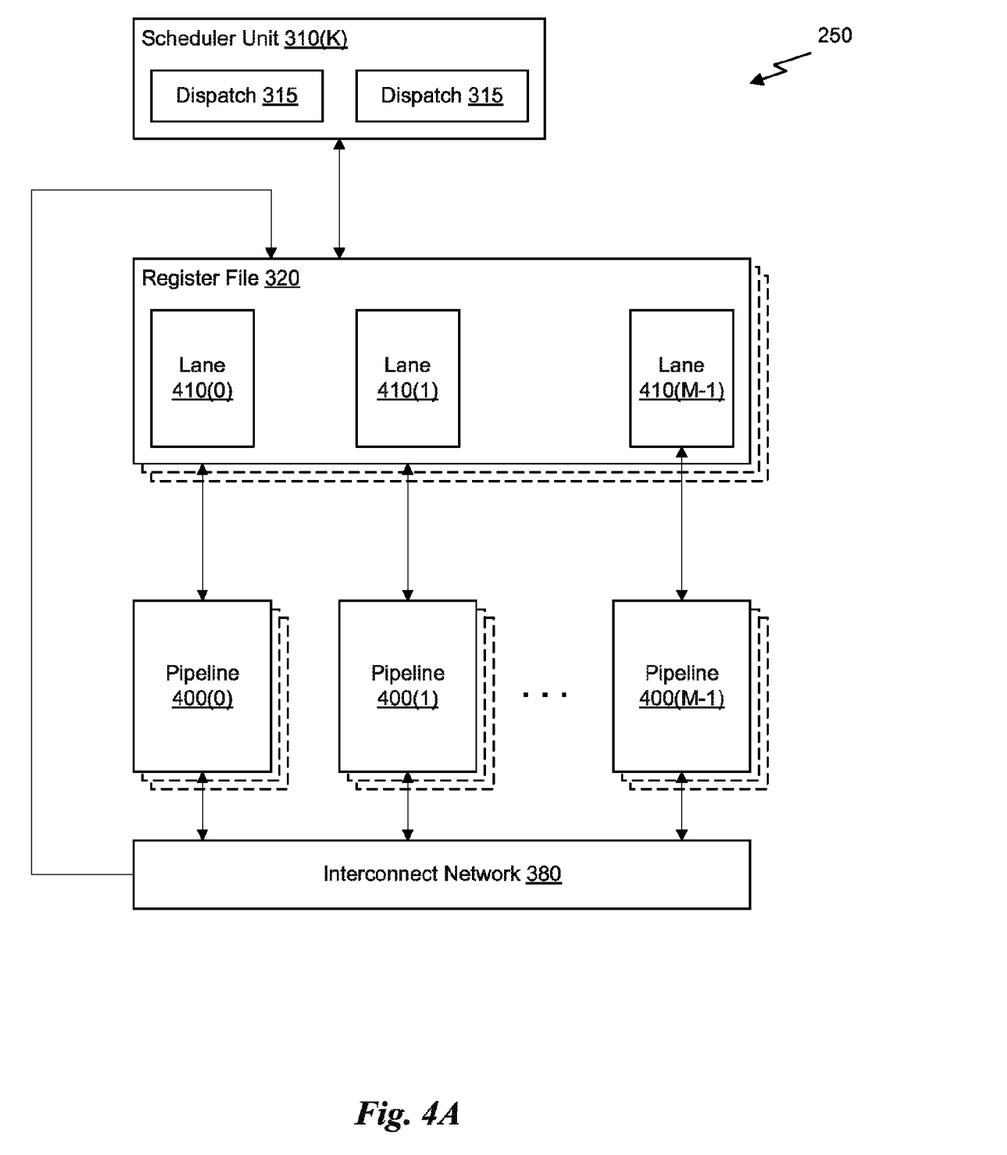
FIG. 4A illustrates a portion of the streaming multiprocessor of FIG. 2 configured to implement the multi-cycle, register file bypass mechanism, in accordance with one embodiment.

FIG. 4A illustrates a portion of an SM 250 of FIG. 2 configured to implement the multi-cycle, register file bypass mechanism, in accordance with one embodiment. As shown in FIG. 4A, the scheduler unit 310 is coupled to the register file 320. The register file 320 is divided into a plurality of lanes 410, each lane having one or more registers allocated to a particular execution pipeline 400. The execution pipelines 400 may be, e.g., a core 350, a DPU 351, a SFU 352, or an LSU 353, among other types of pipelined execution units.

In one embodiment, an input of each execution pipeline 400 is coupled to a lane 410 in the register file 320. Each lane 410 may include a plurality of random access memory (RAM) cells arranged as one or more registers for storing instructions and data to be processed by the execution pipelines 400. An output of each execution pipeline 400 is coupled to the interconnect network 380, which is used to route output data from the execution pipeline 400 back to the register file 320. In one embodiment, each SM 250 may be partitioned such that M execution pipelines 400 are coupled to a partition of the register file 320. For example, each portion of the register file 320 may include registers for four lanes 410 coupled to four execution pipelines 400 to form a partition. Each SM 250 may include a number of these partitions such that a plurality of threads is executed simultaneously across a number of partitions of the register file 320. In one embodiment, the plurality of threads is executed in a single-instruction, multiple data (SIMD) architecture (i.e., each thread executes the same instruction). In yet another embodiment, the plurality of threads is executed in a single-instruction, multiple thread (SIMT) architecture (i.e., each active thread executes the same instruction, but threads are allowed to diverge such that some threads execute the current instruction while other threads are idle).

In conventional processors, the processor may enable a bypass mechanism in order to execute instructions more efficiently. Conventionally, the scheduler unit 310 transmits a read address and a write address to the register file 320. Each lane of the register file 320 receives the same read address and the same write address. During a first clock cycle, the output of the execution pipeline 400 is stored in a register specified by the write address. Then, during a subsequent clock cycle, an input for the execution pipeline 400 is read from a register specified by the read address. In order to enable bypass for a particular instruction, the register file 320 includes logic that compares the read address with the write address. It will be appreciated that writing the data to the lane 410 and reading data from the lane 410, using different registers, requires two clock cycles to complete. However, if the read address matches the write address, then the register file 320, in a single cycle, can store data in the register specified by the write address and output the data to the execution pipeline 400 for processing. In such cases, reading the data from the register in the lane 410 is not required, saving one cycle of execution.

In the above case, the logic implemented to compare the read address and the write address is implemented for each and every partition of the register file 320. If an SM 250 includes eight partitions in order to execute 32 simultaneous threads, then such logic may be replicated eight times. It will be appreciated, that in SIMT architecture processors, each and every execution pipeline is executing the same instruction during a given cycle such that the result of each of the eight comparisons will be the same. Copying the logic in each and every partition of the register file 320, therefore, is not an efficient way to determine whether the bypass mechanism should be enabled for a particular lane 410.

Figure 4B:
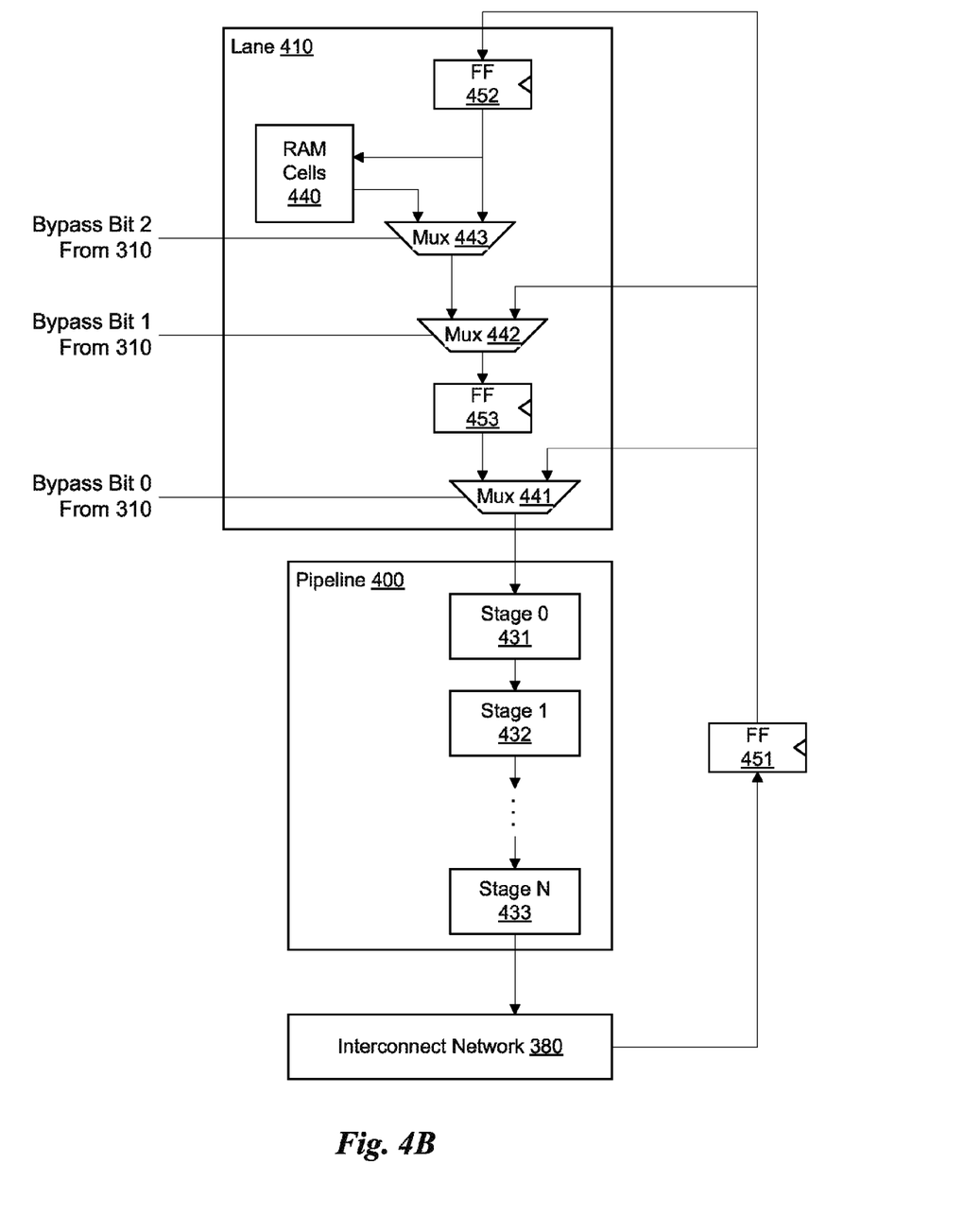
FIG. 4B illustrates a multi-cycle, register file bypass mechanism implemented for two or more threads, in accordance with one embodiment.

FIG. 4B illustrates a multi-cycle, register file bypass mechanism implemented for two or more threads, in accordance with one embodiment. As shown in FIG. 4B, each execution pipeline 400 includes a plurality of stages (e.g., 431, 432, 433, etc.). As is well-known, the first stage 431 of an execution pipeline 400 receives an instruction and processes the instruction to produce intermediate data during a first clock cycle. The intermediate data is transmitted to a second stage 432, which processes the intermediate data to produce next intermediate data during a second clock cycle, and so forth until the last stage 433 receives the last intermediate data and processes the last intermediate data to produce an output data a number of clock cycles after the first stage 431 received the instruction. Once the instruction has been processed by each stage of the execution pipeline 400, the output data is coupled to a first flip-flop 451 via the interconnect network 380. At the next rising clock edge, the output data is transferred from the input side of the first flip-flop 451 to the output side of the first flip-flop 451, which is coupled to a first input of a first multiplexor 441, a first input of a second multiplexor 442, and the input of a second flip-flop 452.

The output of the first flip-flop 451 is connected to the input of the second flip-flop 452. The output of the second flip-flop 452 is then connected to a first input of a third multiplexor 443. This input is essentially the output of the execution pipeline 400 delayed by one clock cycle. The second input of the third multiplexor 443 is coupled to the registers of the lane 410 implemented as a plurality of RAM cells 440. The third multiplexor 443 receives an input control bit (Bypass Bit 2) from the scheduler unit 310. The Bypass Bit 2 is set if the output of the second flip-flop 452 should be selected as the output of the third multiplexor 443 and cleared if the output of the third multiplexor 443 is read from the RAM cells 440. The output of the third multiplexor 443 is coupled to the second input of the second multiplexor 442 along with the output of the first flip-flop 451. The second multiplexor 442 receives another input control bit (Bypass Bit 1) from the scheduler unit 310. The Bypass Bit 1 is set if the output of the first flip-flop 451 should be selected as the output of the second multiplexor 442 and cleared if the output of the third multiplexor 443 is selected as the output of the second multiplexor 442. The output of the second multiplexor 442 is connected to the input of a third flip-flop 453. The third flip-flop 453 transmits the output of the second multiplexor 442 to the second input of the first multiplexor 441, thereby delaying the output of the second multiplexor 442 by one clock cycle. If the output of the second multiplexor 442 is connected to the output of the second flip-flop 452 (through the multiplexors 443 and 442), then the output of the second multiplexor 442 is the output of the execution pipeline 400 delayed by two clock cycles. The first multiplexor 441 receives an input control bit (Bypass Bit 0) from the scheduler unit 310. The Bypass Bit 0 is set if the output of the first flip-flop 451 should be selected as the output of the first multiplexor 441 and cleared if the output of the third flip-flop 453 should be selected as the output of the first multiplexor 441.

At a first clock edge, the output of the last stage 433 of the execution pipeline 400 is transitioned from the input of the first flip-flop 451 to the output of the first flip-flop 451. If the Bypass Bit 0 is set, the output of the first flip-flop 451 is coupled to the input of the first stage 431 of the execution pipeline. However, if the Bypass Bit 0 is not set, then the output of the second multiplexor 442 is coupled to the input of the first stage 431 of the execution pipeline, although delayed by one clock cycle due to the third flip-flop 453. If the Bypass Bit 1 is set, then the output of the second multiplexor 442 is the output of the first flip-flop 451. In other words, if the Bypass Bit 0 is not set and the Bypass Bit 1 is set, then the input to the first stage 431 is the output of the execution pipeline 400 during the previous clock cycle. Similarly, if the Bypass Bit 0 and the Bypass Bit 1 are not set, but the Bypass Bit 2 is set, then the input of the first stage 431 is the output of the execution pipeline 400 delayed by two clock cycles due to the second flip-flop 452 and the third flip-flop 453. In other words, the control bits for the multiplexors can select one of the output of the execution pipeline 400 (Bypass Bit 0), the output of the execution pipeline 400 during the previous clock cycle (Bypass Bit 1), the output of the execution pipeline 400 from two clock cycles prior to the current clock cycle (Bypass Bit 2), and the data specified by the read address in the RAM cells 440.

It will be appreciated that if Bypass Bit 0 is set, then the output of the execution pipeline 400 during the current clock cycle is selected, regardless of the state of the other control bits. Similarly, if Bypass Bit 1 is set (and Bypass Bit 0 is cleared), then the output of the execution pipeline 400 during the previous clock cycle is selected, regardless of the state of the Bypass Bit 2. Thus, only the most significant bit that is set, where Bypass Bit 0 is the most significant bit, determines which bypass path is enabled.

In one embodiment, the read of the RAM cells 440 based on the read address received by the lane 410 may be disabled if any of the control bits are set. In other words, if one of the bypass paths is enabled, the lane 410 may include logic that disables the register access request because the data stored in the register will not be connected to the execution pipeline 400. Disabling the register access request saves power.

In the SIMT architecture, each thread in the 32 threads may be configured as active or inactive using an active mask. The active mask enables thread divergence to be implemented for the different threads. Active threads execute the instruction and inactive threads do not execute the instruction. More specifically, in one embodiment, each stage of the execution pipeline 400 may be clock gated when an instruction being executed by that stage is associated with an inactive thread. In one embodiment, each instruction in the execution pipeline 400 is associated with a valid bit, and the valid bit associated with an instruction is cleared when the instruction is "executed" by an inactive thread. The valid bit may be transmitted from stage to stage within the execution pipeline 400 along with the instruction. In one embodiment, the control bits for the multiplexors (e.g., Bypass Bit 0, Bypass Bit 1, and Bypass Bit 2) are combined with a valid bit for a corresponding instruction in order to control the multiplexor. In other words, an AND gate may be configured to receive the control bit for a corresponding multiplexor along with a valid bit associated with the first input of the multiplexor during that clock cycle. The output of the AND gate is then connected to the control of the multiplexor. Thus, even when the Bypass Bits indicate that the destination address of one of the three previously completed instructions matches the read address for an operand of the present instruction, the bypass mechanism will only be used if the valid bit is set for one of the three previous instructions corresponding to a set control bit.

Figure 4C:
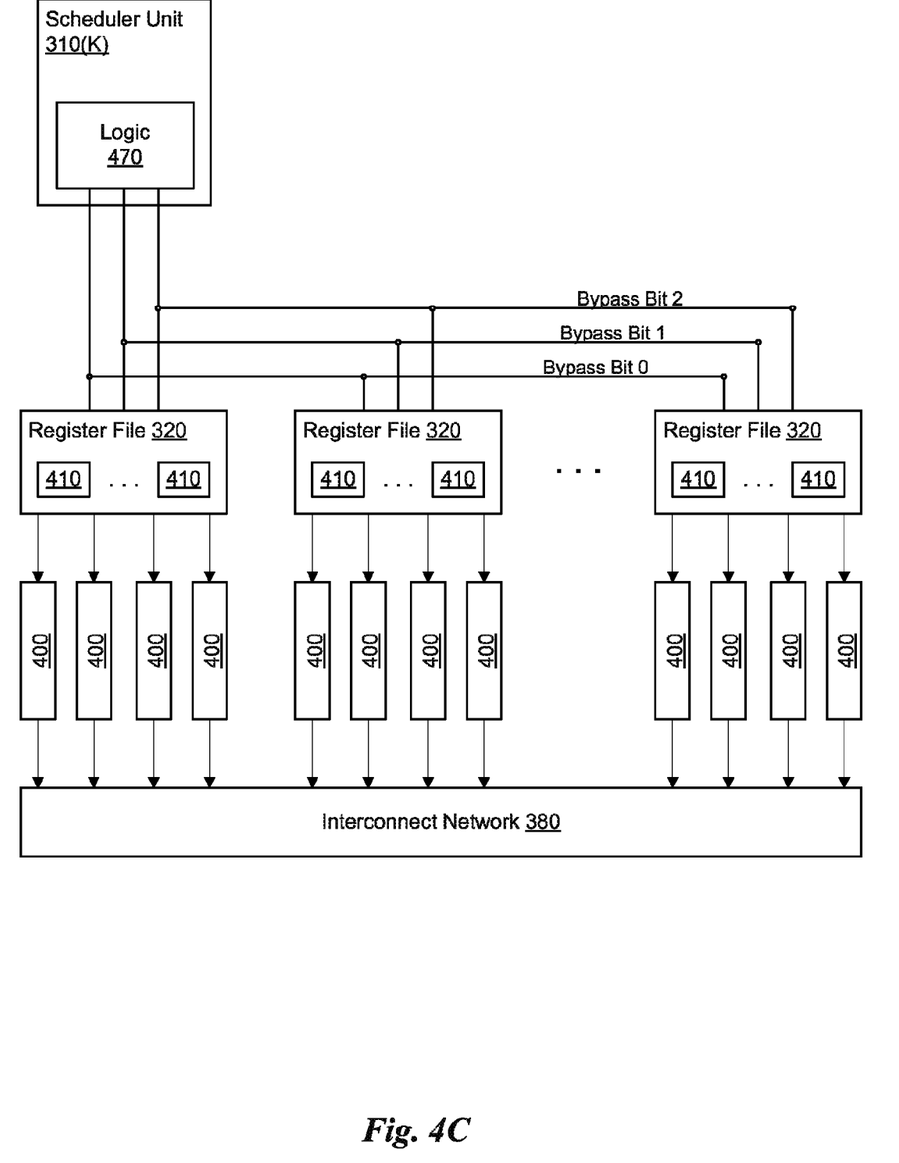
FIG. 4C illustrates communications between the scheduler unit and the partitions of the register file, in accordance with one embodiment.

FIG. 4C illustrates communications between the scheduler unit 310 and the partitions of the register file 320, in accordance with one embodiment. As shown in FIG. 4C, the scheduler unit 310 includes logic 470 that generates the control bits for the multiplexors associated with each lane 410. The same control bits are received by each lane 410 and combined with the valid bits associated with the previous instructions for the lane 410. For example, each scheduler unit 310 may be coupled to eight different partitions of the register file 320, with each partition including four lanes 410 associated with four corresponding execution pipelines 400. This example includes 32 execution pipelines 400 and corresponding lanes 410 executing instructions in parallel. Because the current instruction dispatched to each of the 32 execution pipelines 400 is the same instruction, the logic 470 may compare the register address for an operand of the instruction to the destination address in the register file 320 for one or more instructions issued a number of clock cycles prior to the instruction.

The scheduler unit 310 may track the instructions that are issued to the execution pipelines 400. In one embodiment, the scheduler unit 310 includes a FIFO that tracks which instructions are in flight. The FIFO may have a number of slots equal to or greater than the number of stages in the execution pipelines 400. In other words, the FIFO may be sized such that during each clock cycle, an entry is pushed into the FIFO at the head of the FIFO and an entry is popped from the FIFO at the tail of the FIFO. If no instruction is issued during a particular clock cycle, then an empty entry may be pushed into the FIFO to represent a NOP (no operation). For example, if the execution pipelines include 8 stages, then the FIFO may include 10 entries, which hold the 8 instructions currently being processed by the execution pipelines 400 plus the two previous instructions the execution pipeline has finished processing.

For each instruction scheduled by the scheduler unit 310, the logic 470 can compare one or more operands for the instruction to one or more entries in the FIFO to determine if a destination address in any of the selected entries of the FIFO matches the read address for an operand of the current instruction. In one embodiment, as shown in FIG. 4B, the logic 470 compares the read address to the destination of the last three entries of the FIFO. The control bit for the first multiplexor 441 (Bypass Bit 0) is generated by comparing the destination address for the instruction in the second to last entry in the FIFO with the read address of the current instruction. If the addresses match, then the Bypass Bit 0 is set and the first multiplexor 441 selects the output of the first flip-flop 451 as the input to the first stage 431 of the execution pipelines 400. However, if the addresses do not match, then the Bypass Bit 0 is cleared. Similarly, the control bit for the second multiplexor 442 (Bypass Bit 1) is generated by comparing the destination address for the instruction in the next to last entry in the FIFO with the read address of the current instruction, and the control bit for the third multiplexor 443 (Bypass Bit 2) is generated by comparing the destination address for the instruction in the last entry in the FIFO with the read address of the current instruction. If none of the destination addresses match the read address of the current instruction, then all control bits are cleared and the data read from the RAM cells 440 is transferred to the input of the execution pipelines 400.

Figure 5:
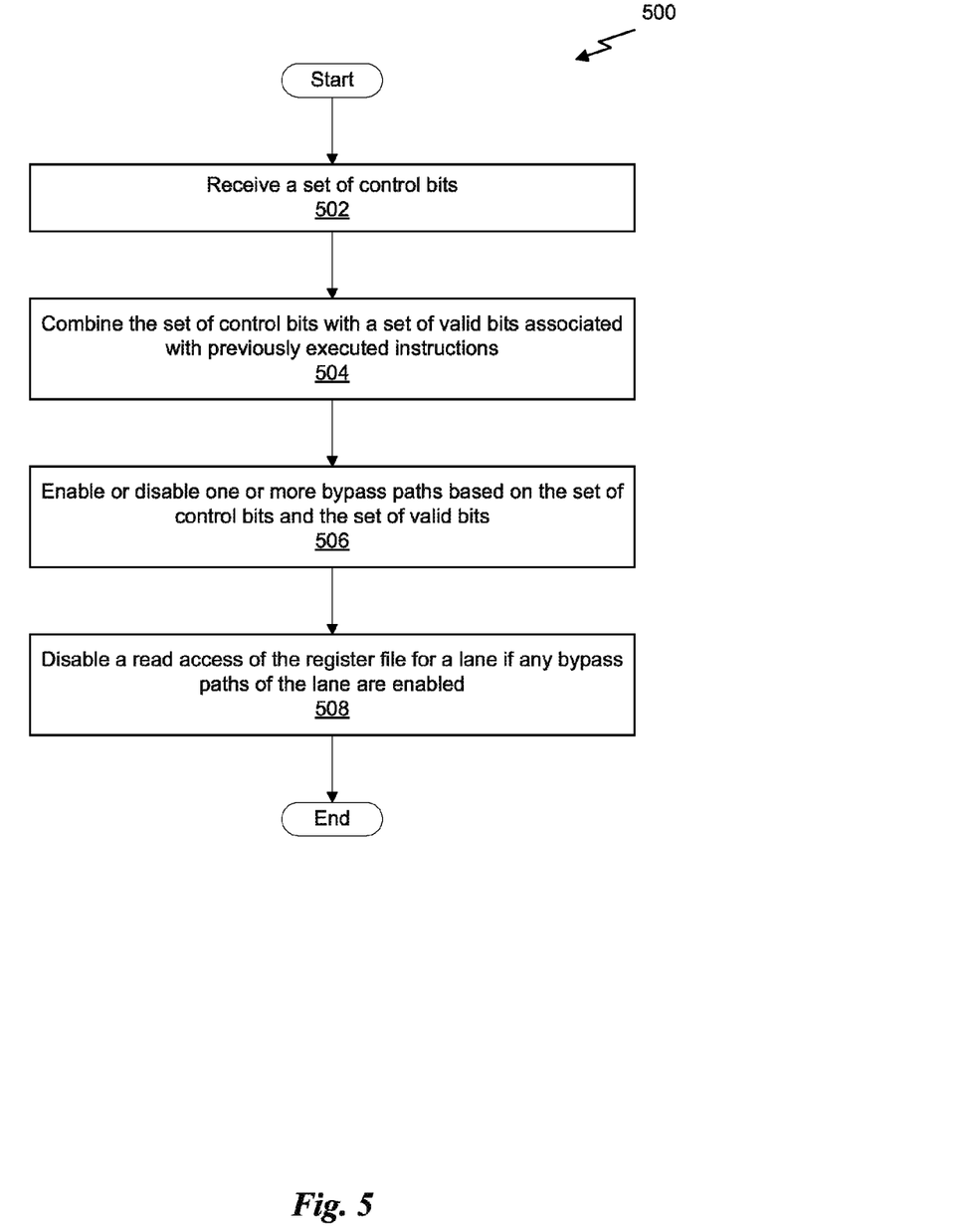
FIG. 5 illustrates a flowchart of a method for executing instructions utilizing a multi-cycle, register file bypass mechanism, according to another embodiment.

FIG. 5 illustrates a flowchart of a method 500 for executing instructions utilizing a multi-cycle, register file bypass mechanism, according to another embodiment. At step 502, a set of control bits is received by a portion of a register file 320. In one embodiment, each lane 410 of the portion of the register file 320 receives one or more control bits such as Bypass Bit 0, Bypass Bit 1, and Bypass Bit 2. At step 504, the set of control bits is combined with a set of valid bits associated with previously executed instructions. In one embodiment, each control bit is combined, via an AND logic gate, with a corresponding valid bit associated with an instruction executed within the particular thread allocated to the lane 410 of the register file 320. For example, the Bypass Bit 0 is combined with a valid bit corresponding to an instruction issued to the execution unit a number of clock cycles prior to the current instruction (e.g., 6 clock cycles), the Bypass Bit 1 is combined with a valid bit corresponding to an instruction issued to the execution unit the number of clock cycles plus one prior to the current instruction (e.g., 7 clock cycles), and the Bypass Bit 2 is combined with a valid bit corresponding to an instruction issued to the execution unit the number of clock cycles plus two prior to the current instruction (e.g., 8 clock cycles). The Bypass Bit 0 is delayed by one cycle to match up with the other two bypass bits given the architecture shown in FIG. 4B (i.e., because the third Flip-Flop 453 is in between the first multiplexor 441 and the second multiplexor 442). In other embodiments, the third Flip-Flop 453 may be positioned after the first multiplexor 441 such that each of the bypass bits for a given control cycle may be produced during the same clock.

At step 506, one or more bypass paths for a lane 410 are enabled or disabled based on the set of control bits and the set of valid bits. In other words, the output of the various AND logic gates enable and disable the multiplexors (e.g., multiplexors 441, 442, and 443), which enables or disables the bypass paths. At step 508, if any of the bypass paths for a lane 410 are enabled, a read access of the register file 320 (i.e., RAM cells 440) is disabled. It will be appreciated that utilizing any of the bypass paths makes reading data from the RAM cells 440 redundant.

Figure 6:
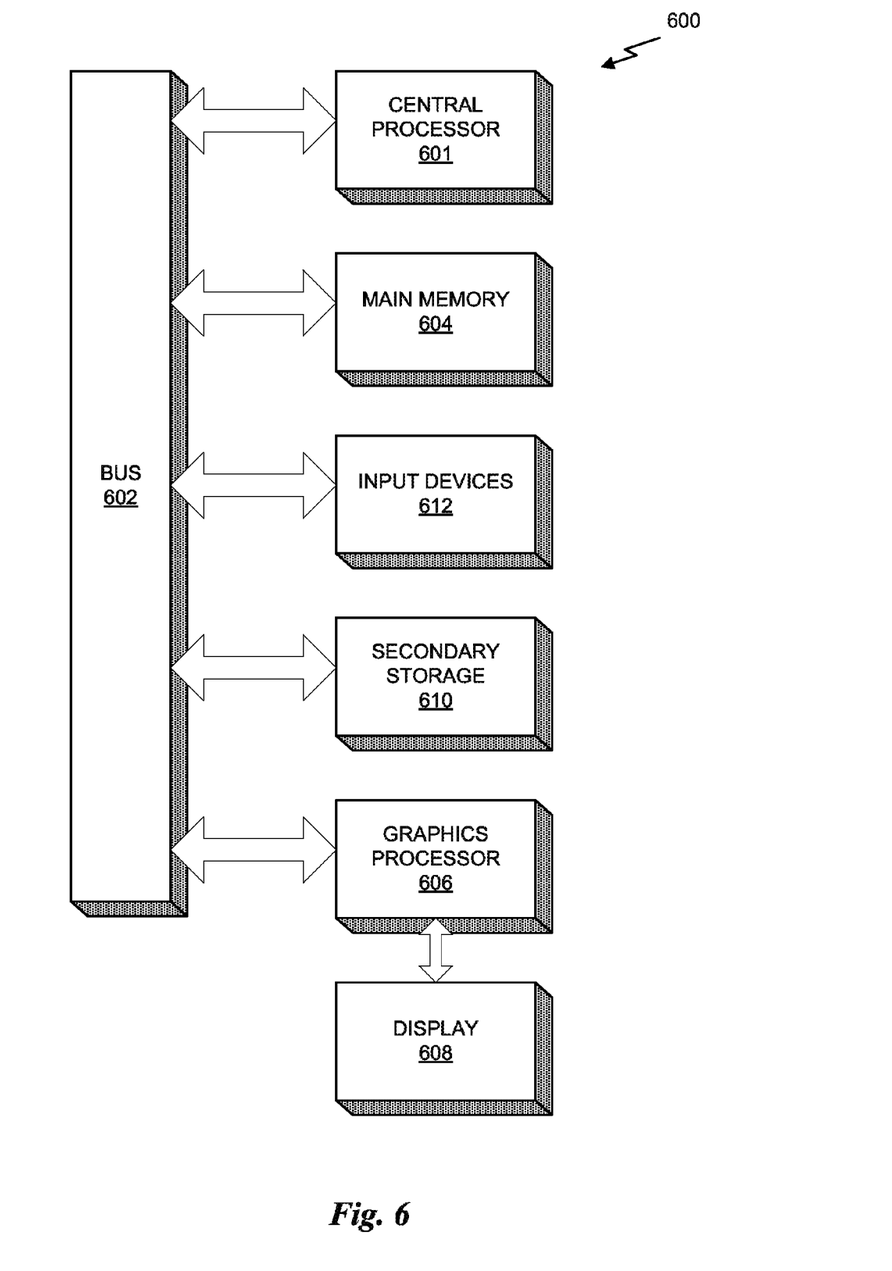
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one central processor 601 that is connected to a communication bus 602. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s). The system 600 also includes a main memory 604. Control logic (software) and data are stored in the main memory 604 which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, and the like. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 604 and/or the secondary storage 610. Such computer programs, when executed, enable the system 600 to perform various functions. The memory 604, the storage 610, and/or any other storage are possible examples of computer-readable media.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, and/or any other type of logic. Still yet, the system 600 may take the form of various other devices including, but not limited to a personal digital assistant (PDA) device, a mobile phone device, a television, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
   receiving, at a register file divided into a plurality of lanes, a set of control bits associated with a current instruction, wherein a scheduler unit is configured to generate the set of control bits;
   combining the set of control bits with a set of valid bits associated with previously issued instructions, each valid bit in the set of valid bits indicating whether execution of an instruction of the previously issued instructions was enabled for a thread in a thread block; and
   for each thread in the thread block, enabling or disabling one or more bypass paths in a corresponding lane of the register file based on the set of control bits and the set of valid bits.

2. The method of claim 1, wherein combining the set of control bits with the set of valid bits comprises, for each control bit, performing a logical AND with the control bit and a corresponding valid bit to generate a final control signal for a multiplexor.

3. The method of claim 2, wherein, for each control bit, the corresponding valid bit is associated with an output tied to an input of the multiplexor.

4. The method of claim 1, further comprising disabling a read access of a register file.

5. The method of claim 1, wherein enabling a bypass path comprises selecting a first input of a multiplexor and disabling a bypass path comprises selecting a second input of a multiplexor.

6. The method of claim 1, wherein the set of control bits comprises a first control bit that corresponds to a first multiplexor of each lane of the register file, and wherein the first control bit is set when a first input of the first multiplexor is selected and the first control bit is cleared when a second input of the first multiplexor is selected.

7. The method of claim 6, wherein the first input is coupled to an output of a flip-flop that represents a result of an instruction issued to an execution pipeline a number of clock cycles prior to a current instruction.

8. The method of claim 7, wherein the second input is coupled, directly or indirectly, to one or more registers of a register file.

9. The method of claim 6, wherein the set of control bits comprises a second control bit that corresponds to a second multiplexor of each lane of the register file, and wherein the second control bit is set when a first input of the second multiplexor is selected and the second control bit is cleared when a second input of the second multiplexor is selected.

10. The method of claim 1, wherein the set of control bits is generated by the scheduler unit by comparing the read address for the current instruction with destination addresses for one or more previous instructions.

11. A non-transitory computer-readable storage medium storing instructions that, when executed by a processor, cause the processor to perform steps comprising:

receiving, at a register file divided into a plurality of lanes, a set of control bits associated with a current instruction, wherein a scheduler unit is configured to generate the set of control bits;

combining the set of control bits with a set of valid bits associated with previously issued instructions, each valid bit in the set of valid bits indicating whether execution of an instruction of the previously issued instructions was enabled for a thread in a thread block; and for each thread in the thread block, enabling or disabling one or more bypass paths in a corresponding lane of the register file based on the set of control bits and the set of valid bits.

12. The non-transitory computer-readable storage medium of claim 11, wherein combining the set of control bits with the set of valid bits comprises, for each control bit, performing a logical AND with the control bit and a corresponding valid bit to generate a final control signal for a multiplexor.

13. The non-transitory computer-readable storage medium of claim 11, wherein the set of control bits is generated by the scheduler unit by comparing the read address for the current instruction with destination addresses for one or more previous instructions.

14. A system comprising:
a register file divided into a plurality of lanes, each lane including one or more bypass paths;
a scheduler unit configured to generate a set of control bits associated with a current instruction; and
a plurality of execution pipelines, wherein each execution pipeline of the plurality of execution pipelines is associated with a lane of the plurality of lanes, and wherein each lane includes logic configured to:
receive a set of control bits,
combine the set of control bits with a set of valid bits associated with previously issued instructions, each valid bit in the set of valid bits indicating whether execution of an instruction of the previously issued instructions was enabled for a thread in a thread block, and
enable or disable the one or more bypass paths based on the set of control bits and the set of valid bits.

15. The system of claim 14, wherein the logic comprises an AND logic gate coupled to a control input of a first multiplexor.

16. The system of claim 15, wherein a first input of the first multiplexor is coupled to an output of a flip-flop that represents a result of an instruction issued to an execution pipeline a number of clock cycles prior to the current instruction and a second input of the first multiplexor is coupled, directly or indirectly, to one or more registers of the register file.

17. The system of claim 15, wherein the logic further comprises a second AND logic gate coupled to a control input of a second multiplexor.

18. The system of claim 14, wherein the scheduler unit is configured to generate the set of control bits by comparing the read address for a current instruction with destination addresses for one or more previous instructions.

19. The system of claim 14, wherein the logic is configured to disable a read access of the register file if one or more of the control bits is set.

20. The system of claim 14, wherein the plurality of execution units are configured in a single-instruction, multiple thread (SIMT) architecture.

* * * * *